(12) United States Patent
Grudzinski et al.

(10) Patent No.: US 7,367,609 B2
(45) Date of Patent: May 6, 2008

(54) AUTOMOTIVE GLAZING SYSTEM WITH DEPLOYABLE WIND EXCITATION SUPPRESSOR

(75) Inventors: Gregory Grudzinski, Perrysburg, OH (US); Greg Ehlert, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 171 days.

(21) Appl. No.: 11/383,771

(22) Filed: May 17, 2006

(65) Prior Publication Data

US 2007/0267891 A1    Nov. 22, 2007

(51) Int. Cl.
*B60J 1/20* (2006.01)
(52) U.S. Cl. .................. 296/180.1; 296/152
(58) Field of Classification Search ........... 296/180.1, 296/146.16, 152; 49/502
See application file for complete search history.

(56) References Cited

U.S. PATENT DOCUMENTS

| | | | |
|---|---|---|---|
| 1,917,093 A | 7/1933 | Cameron | |
| 2,281,840 A | 5/1942 | Hamilton | |
| 2,608,926 A | 9/1952 | Helsley | |
| 3,785,699 A * | 1/1974 | Molaskey et al. | 296/152 |
| 4,396,224 A | 8/1983 | Hayakawa | |
| 4,423,668 A | 1/1984 | Long | |
| 4,476,774 A | 10/1984 | Liberto et al. | |
| 5,702,149 A | 12/1997 | Sweeney | |
| 6,098,925 A | 8/2000 | Burdsall, II et al. | |
| 6,279,987 B1 | 8/2001 | Keeney et al. | |
| 6,712,413 B1 | 3/2004 | Flowerday | |

* cited by examiner

*Primary Examiner*—Joseph D Pape
(74) *Attorney, Agent, or Firm*—Gigette M. Bejin; Dickinson Wright PLLC

(57) ABSTRACT

An automotive glazing system includes a closure structure having a storage space for a moveable glazing panel which is slidably housed within the closure structure. A deployable air deflector mounted to a sash portion of the closure structure is moveable between a stowed position which the entirety of the air deflector is inboard of the glazing panel, and a deployed position in which the free end of the air deflector extends laterally outboard of the outermost part of the sash.

11 Claims, 6 Drawing Sheets

AUTOMOTIVE GLAZING SYSTEM WITH DEPLOYABLE WIND EXCITATION SUPPRESSOR

BACKGROUND OF THE INVENTION

1. Field of the Invention

The present invention relates to a system for mitigating wind buffeting associated with the use of drop glass in vehicle closure panels such as quarter panels and doors.

2. Disclosure Information

Automotive wind deflectors have been the subject of a good deal of inventive attention. U.S. Pat. No. 1,917,093; U.S. Pat. No. 2,281,840; and U.S. Pat. No. 2,608,926 all disclose various wind deflectors which in one fashion or another redirect air passing by a moving vehicle. None of these prior art deflectors deploys automatically when a glazing panel or window is lowered within a vehicle door or quarter panel. All of these known deflectors require that the deflector be placed and moved into a deployed configuration by a motorist if redirection is desired. Moreover, known deflectors do not serve to eliminate an annoying condition caused by either high or low frequency air flow into and out of a passenger compartment of the vehicle through the side windows of the vehicle. Such air flow may cause a high or low frequency throbbing noise which is objectionable to many motorists.

A wind excitation suppressor according to present invention is self-deploying and prevents the wind throb cited above by re-directing the air flow so as to reduce the high or low frequency inflow and outflow which would otherwise occur.

SUMMARY OF THE INVENTION

An automotive glazing system includes a closure structure having a storage space for a moveable glazing panel, and a sash extending upwardly from the storage space. At least one glazing panel run extends from the storage space to an upper portion of the sash. The glazing panel run includes a channel having an outboard wall. A glazing panel is slidably mounted within the closure structure upon the glazing panel run and is moveable from an open position, in which the glazing panel is housed at least primarily within the storage space, to a closed position in which the glazing panel is extended to an uppermost portion of the sash. A deployable air deflector is mounted to the sash adjacent the glazing panel run. The air deflector has a stowed position in which the entirety of the air deflector is inboard of the glazing panel, and the deployed position in which a free end of the air deflector extends laterally outboard of the outermost part of the sash. The glazing panel causes the air deflector to move from its deployed position to its stowed position whenever the glazing panel is moved from its open position to its closed position. Conversely, restorative forces associated with the air deflector cause the air deflector to move from its stowed to its deployed position whenever the glazing panel is moved from its closed position to its open position.

According to one aspect of the present invention, a deployable air deflector may include a spring fin having a base cantilevered to the sash, with the spring fin extending along the glazing panel run such that contact between the glazing panel and the spring fin cause the spring fin to move into its stowed position. The spring fin has a restorative force sufficient to cause the spring fin to move into the deployed position when the glazing panel is not in contact with the spring fin. The spring fin may either be a rigid fin having a base pivotably mounted to the sash and being urged by a separate resilient element to rotate outboard about the pivot, and with the fin extending along the glazing panel run such that contact between the glazing panel and fin causes the fin to move in the stowed position. Alternatively, the air deflector may include a resilient fin having a base cantilevered to the sash, or to the glass run, with the resilient fin having an internal restorative force sufficient to cause at least a first portion of the resilient fin to move into its deployed position when the glazing panel is in contact with only a second portion of the resilient fin. In other words, if only a portion of the resilient fin is covered by the glazing panel, the remainder of the resilient fin will be free to assume its deployed, rather than stowed, position.

According to another aspect of the present invention, a combination wind excitation suppressor and seal member is positioned along the glazing panel run such that when the combination member is in its stowed position it also functions as a weather seal between the glazing panel and the closure panel sash.

According to another aspect of the present invention, an appliqué molding and wind excitation suppressor may be pivotably mounted to the sash of a closure structure such that an actuator driven by the glazing panel positions the combination appliqué molding and wind excitation suppressor as described above.

It is an advantage of a wind excitation suppressor according to the present invention that wind throb may be controlled without the need for motor driven deflector devices. However, a motor or pneumatic piston device could be used to position the current wind excitation suppressor.

It is a further advantage of the present wind excitation suppressor that use of the device as a sealing structure eliminates the need for a conventional weather seal.

Other advantages, as well as features and objects of the present invention, will become apparent to the reader of this specification.

BRIEF DESCRIPTION OF THE DRAWINGS

FIG. 2a is a horizontal section of the sash portion of door 22, taken along the line 2a-2a of FIG. 1. FIG. 2b is a similar section taken along the line 2b-2b of FIG. 1.

DETAILED DESCRIPTION OF THE PREFERRED EMBODIMENTS

Figure 1:
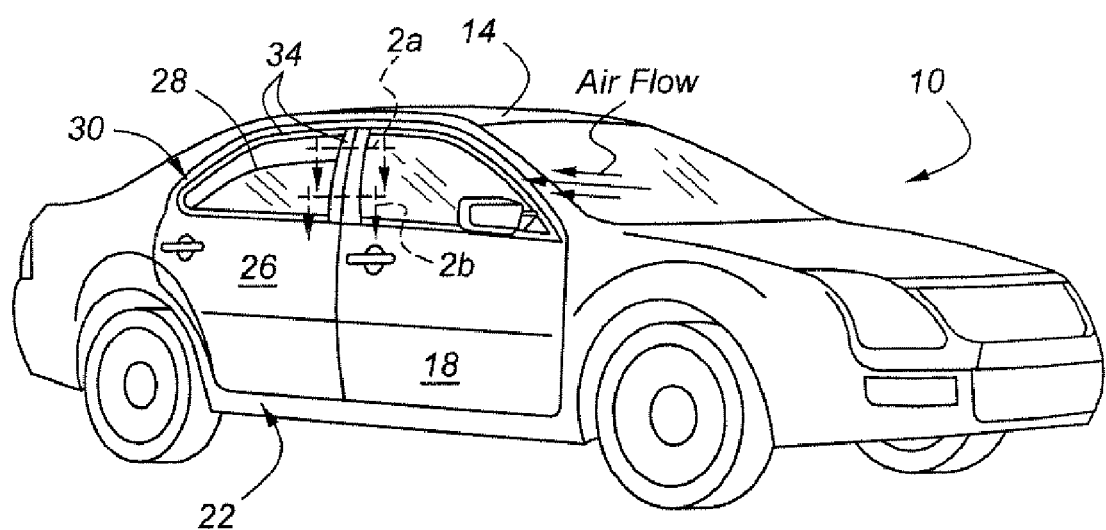
FIG. 1 is a perspective view of a vehicle having at least one automotive glazing system according to the present invention.

As shown in FIG. 1, the body of vehicle 10 defines a passenger cabin having a top, 14. The passenger cabin is closed by a multitude of closure structures such as front door 18 and rear door 22. As used herein, the term "closure structure" means either a door, or a fixed panel, such as a quarter panel. In all cases, closure structures concerned with this invention are closure structures having a moveable glazing panel housed therein. Accordingly, door 22 has a storage space, 26, for housing glazing panel 28, which, is shown in a partially open position, and which may be moved upwardly and downwardly along a glassrun, 32, (see FIGS. 2*a*, 2*b*, 3 and 4). Glassrun 32 is attached to sash 30, which is described in greater detail below.

Figure 2A:
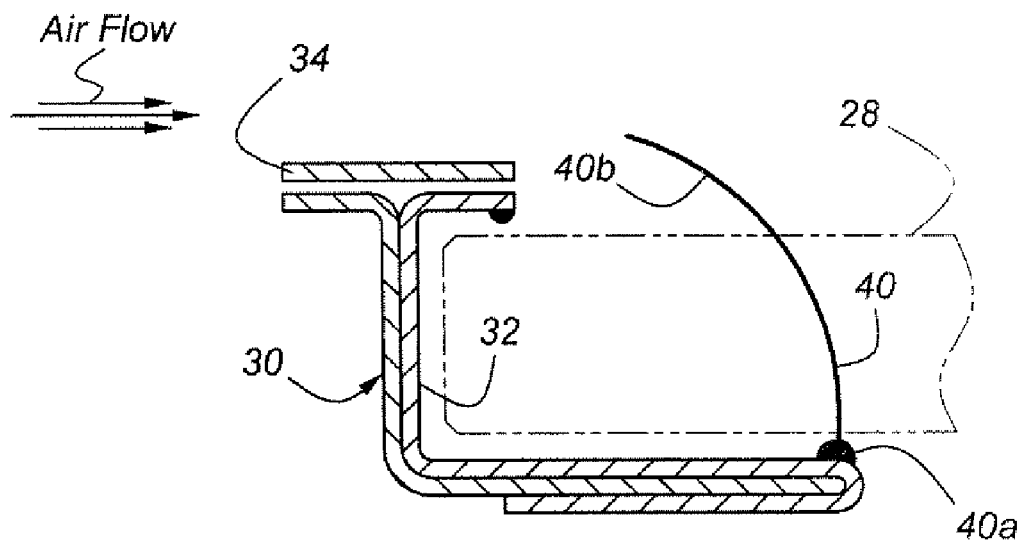
FIGS. 2a and 2b illustrate a first embodiment of a deployable air deflector according to the present invention, shown in its deployed and stowed positions, respectively.
Figure 2B:
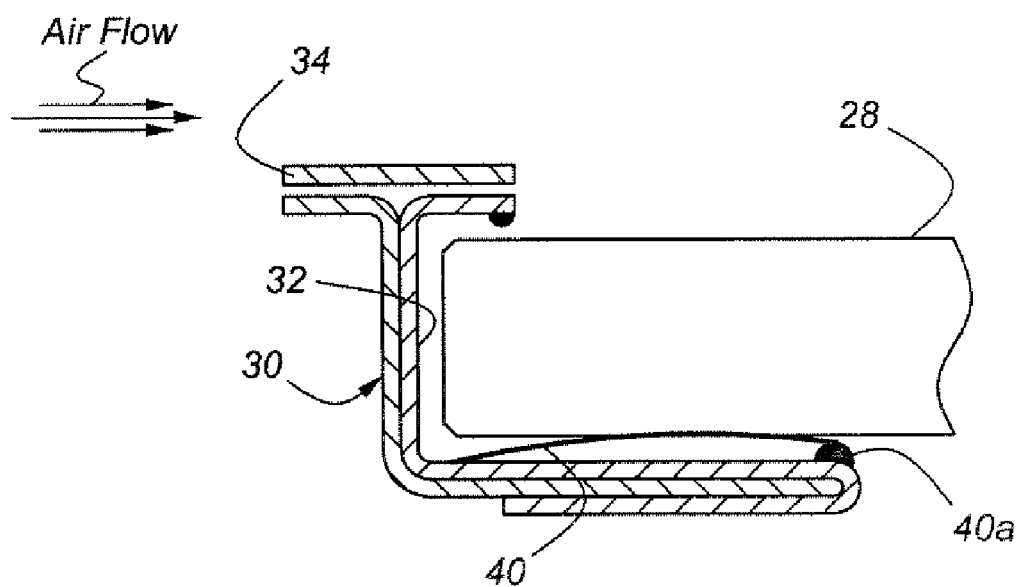

Turning now to FIGS. 2*a* and 2*b*, sash 30 is shown as providing a mounting structure for glazing panel run 32, which guides glazing panel 28 as the glass is moved upwardly and downwardly by a window regulator (not shown). Sash pillar 34 is also shown as having been applied to sash 30. Pillar 34 also serves to provide an additional mounting structure for glassrun 32.

FIG. 2*a* shows a first embodiment of the present invention, namely resilient fin 40, which functions as a deployable air deflector. FIG. 2*a* shows resilient fin 40 in its deployed position, wherein free end 40*b* of resilient fin 40 extends laterally outboard of the outermost part of sash pillar 34. Resilient fin 40 assumes this position when glazing panel 28 is housed at least primarily within storage space 26. In essence, when glazing panel 28 is in its open position, restorative forces within resilient fin 40 causes fin 40 to move to the deployed position shown in FIG. 2*a*. When, however, door glass 28 is in its closed position, fin 40 moves to the stowed position shown in FIG. 2*b*. As glass 28 moves into its raised, or closed, position, glass 28 physically compresses or deflects fin 40 to achieve the positioning shown in FIG. 2*b*. When positioned as shown in FIG. 2*b*, resilient fin 40 performs a secondary function of sealing the joint between glass 28 and an inboard portion of glassrun 32. Resilient fin 40 also prevents rattling or vibration of glass 28. Resilient fin 40 is preferably molded from an elastomer such as EPDM rubber. Depending upon the material selected for fin 40, the fin may be constructed such that only that portion of fin 40 being compressed by glazing panel 28 has the position shown in FIG. 2*b*, with the balance of fin 40 remaining in the deployed position depicted in FIG. 2*a*.

Figure 3A:
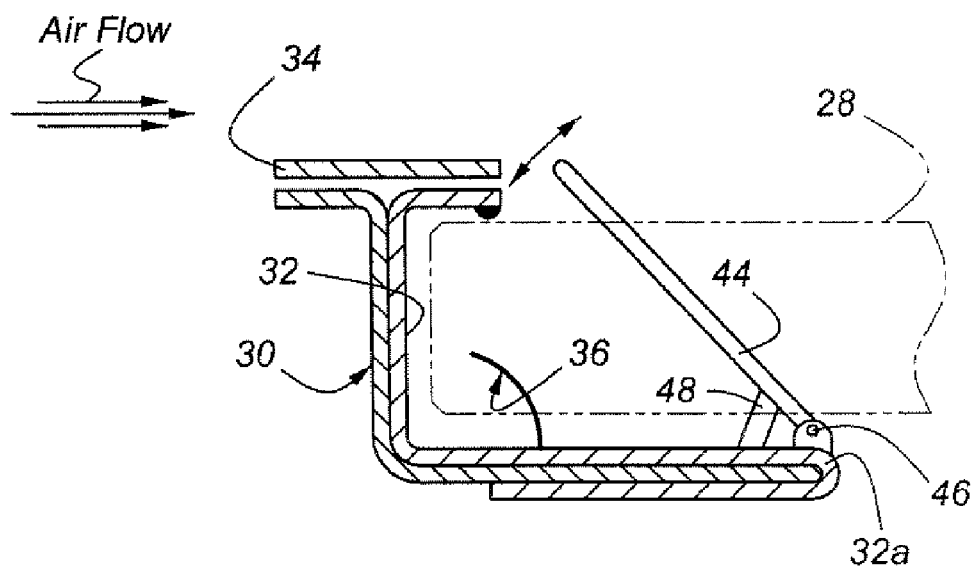
FIGS. 3a and 3b illustrate a second embodiment of a spring fin according to the present invention.
Figure 3B:
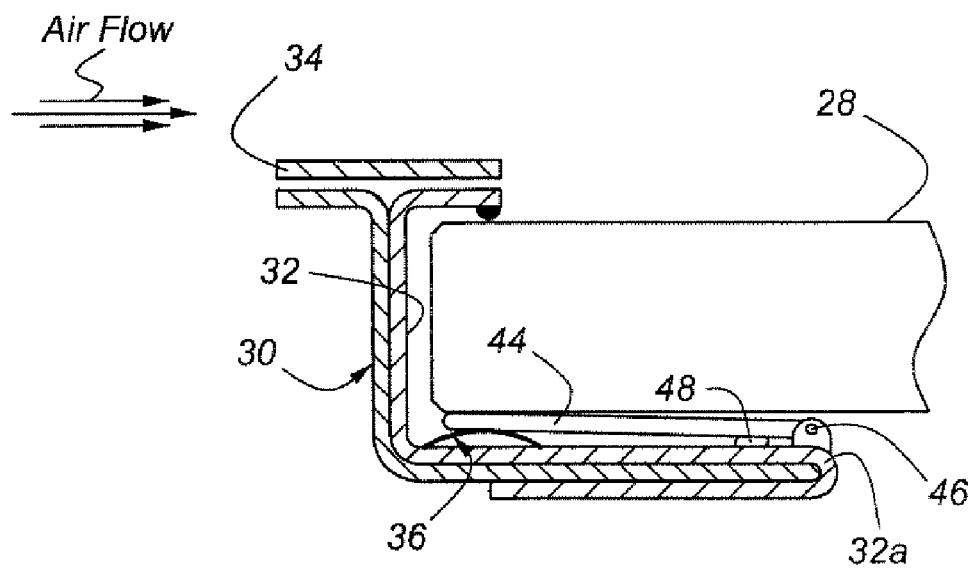

FIGS. 3*a* and 3*b* illustrate an embodiment of the present invention in which a deployable air deflector includes a rigid fin, 44 which is pivotably mounted upon glassrun 32 by means of pivot 46. Rigid fin 44 is urged into the deployed position shown in FIG. 3*a* by means of a resilient element, 48, which is positioned between rigid fin 44 and a base portion, 32*a*, of glassrun 32. FIG. 3 also shows an inner sealing lip, 36, which, as shown in FIG. 3*b*, provides additional sealing and anti-rattle capability when rigid fin 44 is in its stowed position.

Figure 4A:
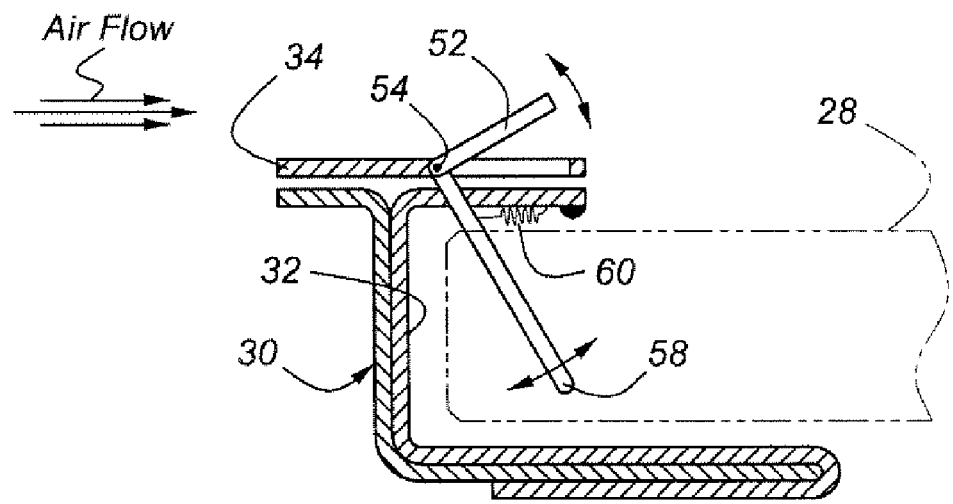
FIGS. 4a and 4b illustrate a deployable appliqué applied to the sash pillar of a closure structure according to another aspect of the present invention.
Figure 4B:
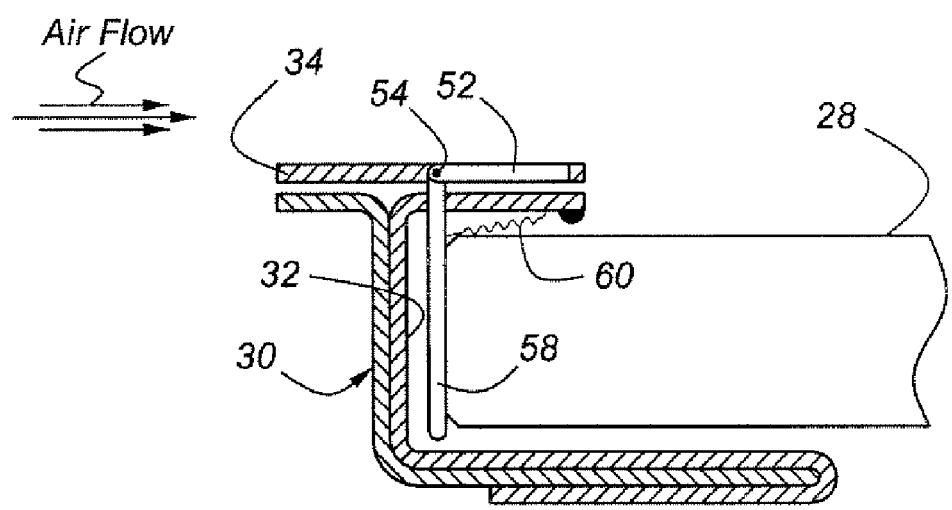

FIGS. 4*a* and 4*b* illustrate an embodiment in which a deployable air deflector is mounted upon sash pillar 34 in the form of an appliqué strip, 52, which is positioned by means of control rod 58 and tension spring 60. Accordingly, when glass panel 28 is moved into its lowered position (FIG. 4*a*), tension spring 60 will apply a force to control rod 58 sufficient to generate a torque to move appliqué 52 to its deployed position. If however, glass 28 is put in its fully closed position glass 28 will displace control rod 58 and create an opposing torque sufficient to move appliqué 52 to a flattened position within sash pillar 34 (FIG. 4*b*).

Figure 5A:
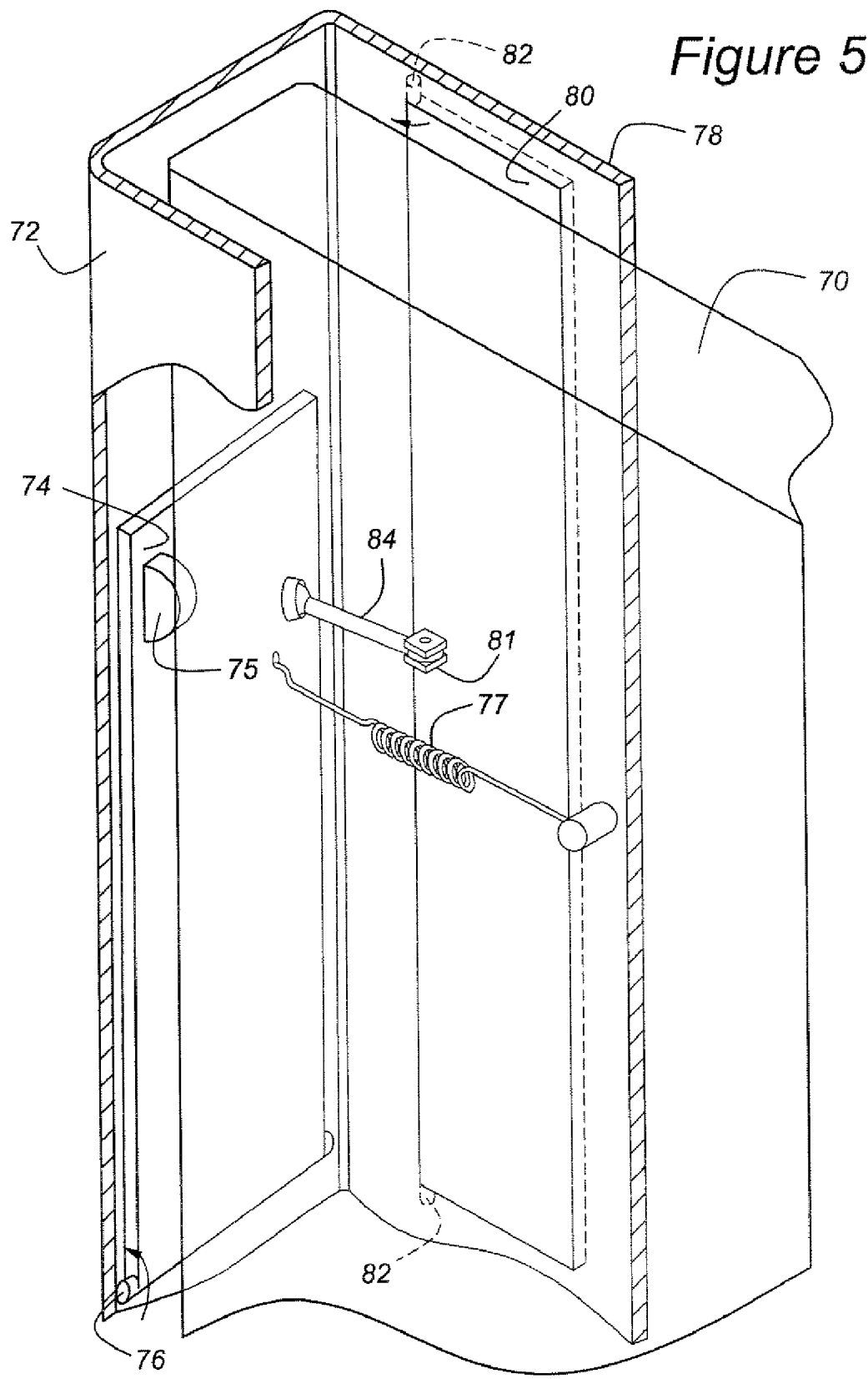
FIGS. 5a and 5b illustrate a second embodiment of a deployable combination appliqué and wind excitation suppressor according to the present invention.
Figure 5B:
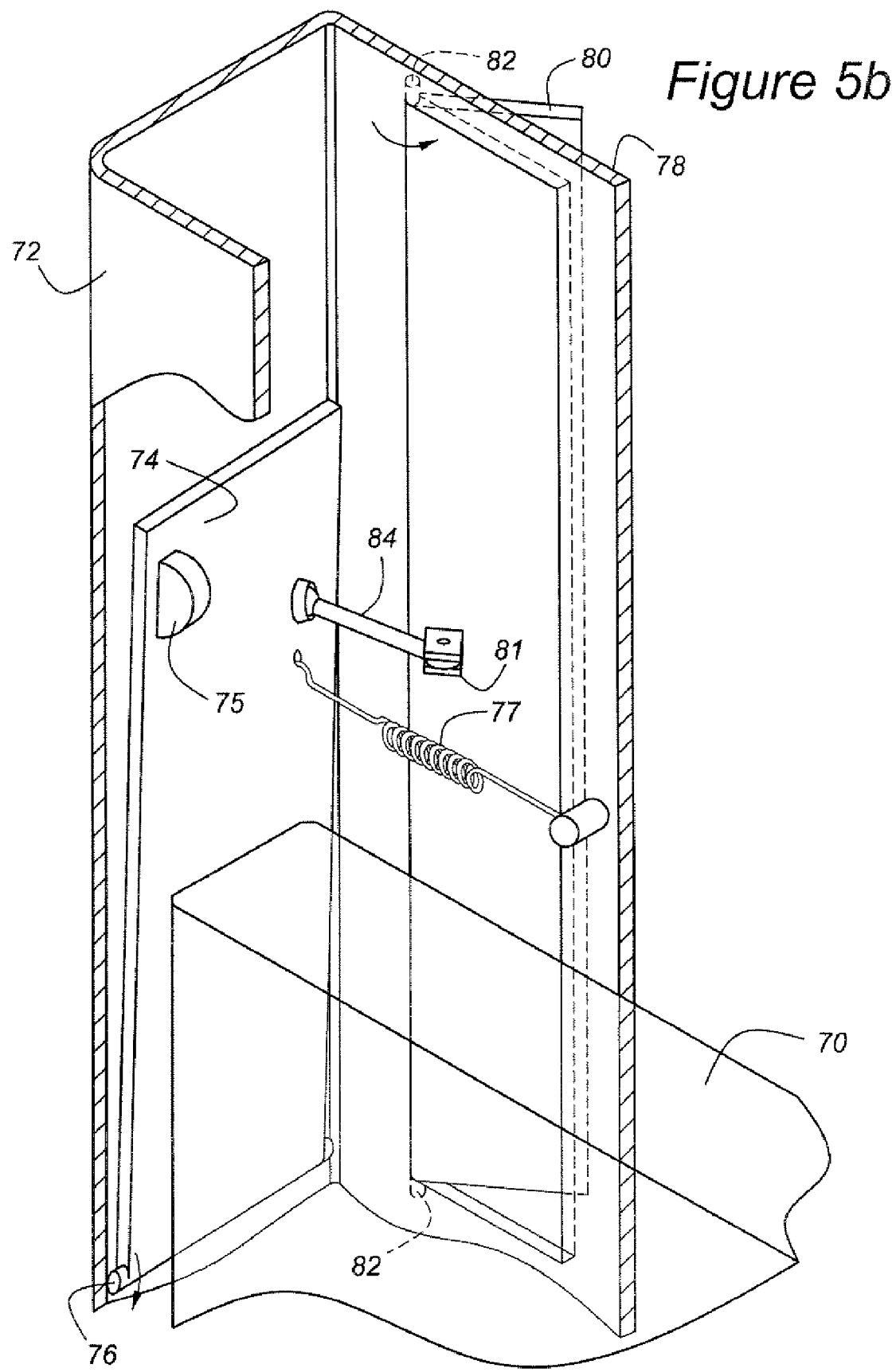

FIGS. 5*a* and 5*b* illustrate a second embodiment in which a deployable air deflector is mounted upon sash pillar 78 in the form of an appliqué strip, 80, which is rotatable about pivots 82, and which is positioned by means of toggle 74 and tension spring 77. Toggle 74 is mounted to glassrun 72 and rotates about pivot 76. Tension spring 77 causes toggle 74 to move in a direction tending to cause link 84 to push appliqué strip 80 into a deployed position. Accordingly, when glass panel 70 is moved into its lowered position (FIG. 5*b*), tension spring 77 will apply a force to toggle 77 sufficient to move appliqué 80 to its deployed position. If however, glass 70 is put in a closed position, glass will push on striker 75 and rotate toggle 74 rearward, so as to cause link 84 to pull appliqué 80 to its stowed position (FIG. 5*a*).

Although the present invention has been described in connection with particular embodiments thereof, it is to be understood that various modifications, alterations, and adaptations may be made by those skilled in the art without departing from the spirit and scope of the invention set forth in the following claims. For example, the present deployable air deflector could be actuated by not only the disclosed means, but alternatively by a motor drive or by a pneumatic actuator, or by other appropriate means.

What is claimed:

1. An automotive glazing system, comprising:
a closure structure, having a storage space for a movable glazing panel, and a sash extending upwardly from said storage space;
at least one glazing panel run extending from said storage space to an upper portion of said sash, with said glazing panel run comprising a channel having an outboard wall;
a glazing panel slidably mounted within the closure structure upon said glazing panel run and being movable from an open position in which said glazing panel is housed at least primarily within said storage space, to a closed position in which the glazing panel is extended to an uppermost portion of the sash; and
a deployable air deflector mounted said glazing panel run, with said air deflector having a stowed position in which the entirety of the air deflector is inboard of said glazing panel, and a deployed position in which a free end of the air deflector extends laterally outboard of the outermost part of the sash.

2. An automotive glazing system according to claim 1, wherein said glazing panel causes said deployable air deflector to move from its deployed position to its stowed position whenever said glazing panel is moved from its open position to its closed position.

3. An automotive glazing system according to claim 1, wherein said deployable air deflector is caused to move from its stowed position to its deployed position whenever said glazing panel is moved from its closed position to its open position.

4. An automotive glazing system according to claim 1, wherein said deployable air deflector comprises a spring fin having a base cantilevered to said sash, with said spring fin extending along said glazing panel run such that contact between said glazing panel and said spring fin will cause the spring fin to move into the stowed position, with the spring fin having a restorative force sufficient to cause the spring fin to move into the deployed position when the glazing panel is not in contact with the spring fin.

5. An automotive glazing system according to claim 4, wherein said spring fin comprises an arcuate, unitary fin which presents a curved surface to air passing over a vehicle during normal driving conditions.

6. An automotive glazing system according to claim 1, wherein said deployable air deflector comprises a rigid fin having a base pivotably mounted to said sash and being urged by a resilient element to rotate outboard about said pivot, and with said fin extending along said glazing panel run such that contact between said glazing panel and said fin causes said fin to move into the stowed position, and with said resilient element having a restorative force sufficient to cause the fin to move into the deployed position when the glazing panel is not in contact with the fin.

7. An automotive glazing system according to claim 1, wherein said deployable air deflector comprises a resilient fin having a base cantilevered to said sash, with said resilient fin extending along said glazing panel run such that contact between said glazing panel and said resilient fin will cause any portion of the resilient fin being contacted by the glazing panel to move into the stowed position, with the resilient fin having an inner restorative force sufficient to cause at least a first portion of the resilient fin to move into the deployed position when the glazing panel is in contact with only a second portion of the resilient fin.

8. An automotive glazing system according to claim 1, wherein said deployable air deflector functions as a seal between said glazing panel and said glazing panel run when said deflector is in its stowed position.

9. An automotive glazing system, comprising:
  a closure structure having a storage space for a movable glazing panel and a sash extending upwardly from said storage space;
  at least one glazing panel run extending from said storage space to an upper portion of said sash;
  a glazing panel slidably mounted within the closure structure upon said glazing panel run and being movable from an open position in which said glazing panel is housed at least primarily within said storage space, to a closed position in which the glazing panel is extended to an uppermost portion of the sash; and
  a combination wind excitation suppressor and seal member extending along said glazing panel run, with said combination member being mounted to said sash adjacent an inboard portion of said glazing panel run, and with said combination member having a sealing position in which the entirety of the combination member is subjected to compressive force by said glazing panel when said glazing panel is closed, and a deflector position in which a free end of the combination member extends laterally outboard of the outermost part of the sash in a direction generally parallel to said glazing panel run when said glazing panel is open.

10. An automotive glazing system, comprising:
  a closure structure having a storage space for a movable glazing panel and a sash extending upwardly from said storage space and defining a window opening;
  at least one glazing panel run extending from said storage space to an upper portion of said sash;
  a glazing panel slidably mounted within the closure structure upon said glazing panel run and being movable from an open position in which said glazing panel is housed at least primarily within said storage space, to a closed position in which the glazing panel is extended to an uppermost portion of the sash; and
  a combination appliqué molding and wind excitation suppressor pivotably mounted to said sash, and extending along said sash in a direction generally parallel to said glazing panel run, with said appliqué molding and wind excitation suppressor being rotatable from a stowed position in which said molding lies flat against a portion of said sash, to a deployed position in which said molding extends outboard from said sash, whereby air flowing past said sash will be redirected from said window opening.

11. An automotive glazing system according to claim 10, wherein the position of said combination appliqué molding and wind excitation suppressor is controlled by an actuator driven by said glazing panel.

\* \* \* \* \*